(12) United States Patent
van As et al.

(10) Patent No.: US 8,036,689 B2
(45) Date of Patent: Oct. 11, 2011

(54) METHOD AND APPARATUS FOR DISTRIBUTING MESSAGES TO MOBILE RECIPIENTS

(75) Inventors: Nicolaas Theunis Rudie van As, Groningen (NL); Rentje Theodoor Koning, Groningen (NL); Bart-Jan Buijze, Haarlem (NL)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 12/729,471

(22) Filed: Mar. 23, 2010

(65) Prior Publication Data

US 2010/0182945 A1    Jul. 22, 2010

Related U.S. Application Data

(63) Continuation of application No. 10/557,107, filed as application No. PCT/NL2004/000335 on May 14, 2004, now Pat. No. 7,697,944.

(51) Int. Cl.
*H04W 4/00* (2009.01)
*H04M 1/725* (2006.01)
*H04M 1/663* (2006.01)
*H04H 20/71* (2008.01)

(52) U.S. Cl. ............... 455/466; 370/312; 455/414.2

(58) Field of Classification Search ........... 455/466, 455/414.2; 370/312
See application file for complete search history.

(56) References Cited

U.S. PATENT DOCUMENTS

| | | | |
|---|---|---|---|
| 5,408,519 A | 4/1995 | Pierce et al. | |
| 5,613,213 A | 3/1997 | Naddell et al. | |
| 5,978,775 A | 11/1999 | Chen | |
| 5,978,833 A | 11/1999 | Pashley et al. | |
| 6,023,700 A | 2/2000 | Owens et al. | |
| 6,097,942 A | 8/2000 | Laiho | |
| 6,205,432 B1 | 3/2001 | Gabbard et al. | |
| 6,334,145 B1 | 12/2001 | Adams et al. | |
| 6,345,279 B1 | 2/2002 | Li et al. | |
| 6,381,465 B1* | 4/2002 | Chern et al. | 455/466 |
| 6,389,278 B1* | 5/2002 | Singh | 455/414.3 |

(Continued)

FOREIGN PATENT DOCUMENTS

DE    199 41 461 A1    3/2001

(Continued)

OTHER PUBLICATIONS

PCT International Search Report issued by PCT International Searching Authority and mailed Sep. 24, 2004 issued by the International Searching Authority in connection with the related PCT International Application No. PCT/NL2004/000335 (2 pages).

*Primary Examiner* — Jinsong Hu
*Assistant Examiner* — Munsoon Choo
(74) *Attorney, Agent, or Firm* — Novak Druce + Quigg LLP

(57) ABSTRACT

For processing digital communication traffic in a network comprising a central communication processing structure and a number of separate devices of users designed for communication with the central communication processing structure, each time, a communication coming from one of the separate devices is received which communication is addressed to another of the separate devices. It is then checked whether the received communication meets at least one condition applicable to the communication or the sender. In reaction to meeting the condition, a message is added to the communication and the communication including the added message is sent to the addressed device.

61 Claims, 6 Drawing Sheets

U.S. PATENT DOCUMENTS

| | | | |
|---|---|---|---|
| 6,405,243 B1 | 6/2002 | Nielsen | |
| 6,684,249 B1 | 1/2004 | Frerichs et al. | |
| 6,920,326 B2 | 7/2005 | Agarwal et al. | |
| 7,072,947 B1 | 7/2006 | Knox et al. | |
| 7,149,537 B1 | 12/2006 | Kupsh et al. | |
| 7,558,559 B2 | 7/2009 | Alston | |
| 2001/0042017 A1* | 11/2001 | Matsukawa | 705/14 |
| 2001/0047272 A1 | 11/2001 | Frietas et al. | |
| 2002/0052754 A1* | 5/2002 | Joyce et al. | 705/1 |
| 2002/0077130 A1 | 6/2002 | Owensby | |
| 2002/0083411 A1* | 6/2002 | Bouthors et al. | 717/100 |
| 2002/0137507 A1 | 9/2002 | Winkler | |
| 2002/0138291 A1 | 9/2002 | Vaidyanathan et al. | |
| 2002/0141403 A1* | 10/2002 | Akahane et al. | 370/389 |
| 2003/0003935 A1 | 1/2003 | Vesikivi et al. | |
| 2003/0040297 A1 | 2/2003 | Pecen et al. | |
| 2003/0040300 A1 | 2/2003 | Bodic et al. | |
| 2003/0154300 A1 | 8/2003 | Mostafa | |
| 2003/0185356 A1* | 10/2003 | Katz | 379/93.12 |
| 2003/0188017 A1 | 10/2003 | Nomura | |
| 2003/0191689 A1 | 10/2003 | Bosarge et al. | |
| 2003/0197719 A1 | 10/2003 | Lincke et al. | |
| 2004/0043777 A1 | 3/2004 | Brouwer et al. | |
| 2004/0054576 A1* | 3/2004 | Kanerva et al. | 705/14 |
| 2004/0063449 A1* | 4/2004 | Fostick | 455/517 |
| 2004/0136358 A1 | 7/2004 | Hind et al. | |
| 2004/0185883 A1 | 9/2004 | Rukman | |
| 2004/0192359 A1 | 9/2004 | McRaild et al. | |
| 2004/0203761 A1 | 10/2004 | Baba et al. | |
| 2004/0203851 A1 | 10/2004 | Vetro et al. | |
| 2004/0204133 A1 | 10/2004 | Andrew et al. | |
| 2004/0209649 A1 | 10/2004 | Lord | |
| 2004/0240649 A1 | 12/2004 | Goel | |
| 2004/0259526 A1 | 12/2004 | Goris et al. | |
| 2005/0010641 A1 | 1/2005 | Staack | |
| 2005/0060425 A1 | 3/2005 | Yeh et al. | |
| 2005/0125397 A1 | 6/2005 | Gross et al. | |
| 2005/0249216 A1 | 11/2005 | Jones | |
| 2005/0289113 A1 | 12/2005 | Bookstaff | |
| 2006/0031327 A1 | 2/2006 | Kredo | |
| 2006/0095511 A1 | 5/2006 | Munarriz et al. | |
| 2006/0123014 A1 | 6/2006 | Ng | |
| 2006/0129455 A1 | 6/2006 | Shah | |
| 2006/0141923 A1 | 6/2006 | Goss | |
| 2006/0194595 A1 | 8/2006 | Myllynen et al. | |
| 2006/0200460 A1 | 9/2006 | Meyerzon et al. | |
| 2006/0200461 A1 | 9/2006 | Lucas et al. | |
| 2006/0206586 A1 | 9/2006 | Ling et al. | |
| 2006/0276170 A1 | 12/2006 | Radhakrishnan et al. | |
| 2006/0276213 A1 | 12/2006 | Gottschalk et al. | |
| 2006/0286963 A1 | 12/2006 | Koskinen et al. | |
| 2006/0286964 A1 | 12/2006 | Polanski et al. | |
| 2006/0288124 A1 | 12/2006 | Kraft et al. | |
| 2007/0004333 A1 | 1/2007 | Kavanti | |
| 2007/0047523 A1 | 3/2007 | Jiang | |
| 2007/0072631 A1 | 3/2007 | Mock et al. | |
| 2007/0074262 A1 | 3/2007 | Kikkoji et al. | |
| 2007/0083602 A1 | 4/2007 | Heggenhougen et al. | |
| 2007/0088687 A1 | 4/2007 | Bromm et al. | |
| 2007/0088801 A1 | 4/2007 | Levkovitz et al. | |
| 2007/0088851 A1 | 4/2007 | Levkovitz et al. | |
| 2007/0100805 A1 | 5/2007 | Ramer et al. | |
| 2007/0105536 A1 | 5/2007 | Tingo, Jr. | |
| 2007/0117571 A1 | 5/2007 | Musial | |
| 2007/0149208 A1 | 6/2007 | Syrbe et al. | |
| 2007/0290787 A1 | 12/2007 | Fiatal et al. | |
| 2008/0004046 A1 | 1/2008 | Mumick et al. | |
| 2008/0013537 A1 | 1/2008 | Dewey et al. | |
| 2008/0032703 A1 | 2/2008 | Krumm et al. | |
| 2008/0032717 A1 | 2/2008 | Sawada et al. | |
| 2008/0070579 A1 | 3/2008 | Kankar et al. | |
| 2008/0071875 A1 | 3/2008 | Koff et al. | |
| 2008/0082686 A1 | 4/2008 | Schmidt et al. | |
| 2008/0243619 A1 | 10/2008 | Sharman et al. | |
| 2009/0275315 A1 | 11/2009 | Alston | |

FOREIGN PATENT DOCUMENTS

| | | |
|---|---|---|
| DE | 10061984 A1 | 6/2002 |
| EP | 1 073 293 A1 | 1/2001 |
| EP | 1 109 371 A2 | 6/2001 |
| EP | 1 220 132 A2 | 7/2002 |
| EP | 1 239 392 A2 | 9/2002 |
| EP | 1 365 604 A2 | 11/2003 |
| EP | 1 408 705 A1 | 4/2004 |
| EP | 1 455 511 A1 | 9/2004 |
| EP | 1 542 482 A2 | 6/2005 |
| EP | 1587332 A1 | 10/2005 |
| EP | 1 615 455 A2 | 1/2006 |
| EP | 1 633 100 A1 | 3/2006 |
| EP | 1 677 475 A1 | 7/2006 |
| GB | 2 369 218 A | 5/2002 |
| GB | 2 406 996 A | 4/2005 |
| GB | 2 414 621 A2 | 11/2005 |
| JP | 2002/140272 | 5/2002 |
| JP | 2007-087138 A | 4/2007 |
| JP | 2007-199821 A | 8/2007 |
| WO | WO 96/24213 | 8/1996 |
| WO | WO 00/44151 A2 | 7/2000 |
| WO | WO 01/22748 A1 | 3/2001 |
| WO | WO 01/31497 A1 | 5/2001 |
| WO | WO 01/50703 A2 | 7/2001 |
| WO | WO 01/52161 A1 | 7/2001 |
| WO | WO 01/57705 A1 | 8/2001 |
| WO | WO 01/58178 A2 | 8/2001 |
| WO | WO 01/65411 A1 | 9/2001 |
| WO | WO 01/69406 A1 | 9/2001 |
| WO | WO 01/71949 A1 | 9/2001 |
| WO | WO 01/72063 A1 | 9/2001 |
| WO | WO 01/91400 A2 | 11/2001 |
| WO | WO 01/93551 A2 | 12/2001 |
| WO | WO 01/97539 A2 | 12/2001 |
| WO | WO 02/31624 A2 | 4/2002 |
| WO | WO 02/054803 A1 | 7/2002 |
| WO | WO 02/069585 A2 | 9/2002 |
| WO | WO 02/069651 A1 | 9/2002 |
| WO | WO 02/075574 A1 | 9/2002 |
| WO | WO 02/084895 A1 | 10/2002 |
| WO | WO 03/015430 A1 | 2/2003 |
| WO | WO 03/019845 A2 | 3/2003 |
| WO | WO 03/024136 A1 | 3/2003 |
| WO | WO 03/049461 A2 | 6/2003 |
| WO | WO 03/088690 A1 | 10/2003 |
| WO | WO 2004/084532 A1 | 9/2004 |
| WO | WO 2004/086791 A1 | 10/2004 |
| WO | WO 2004/100470 A1 | 11/2004 |
| WO | WO 2004/100521 A1 | 11/2004 |
| WO | WO 2004/102993 A1 | 11/2004 |
| WO | WO 2004/104867 A2 | 12/2004 |
| WO | WO 2005/029769 A1 | 3/2005 |
| WO | WO 2005/076650 A1 | 8/2005 |
| WO | WO 2006/002869 A1 | 1/2006 |
| WO | WO 2006/005001 A2 | 1/2006 |
| WO | WO 2006/016189 A1 | 2/2006 |
| WO | WO 2006/027407 A1 | 3/2006 |
| WO | WO 2006/040749 A1 | 4/2006 |
| WO | WO 2006/093284 A1 | 9/2006 |
| WO | WO 2006/119481 A2 | 11/2006 |
| WO | WO 2008/013437 A1 | 1/2008 |
| WO | WO 2008/045867 A1 | 4/2008 |
| WO | WO 2008/147919 A1 | 12/2008 |

\* cited by examiner

METHOD AND APPARATUS FOR DISTRIBUTING MESSAGES TO MOBILE RECIPIENTS

CROSS-REFERENCE TO RELATED APPLICATIONS

This is a continuation of U.S. patent application Ser. No. 10/557,107 filed Dec. 29, 2006, which is an application under 37 USC 371 of International Application PCT/NL2004/000335 filed May 14, 2004, which in turn claims the benefit of foreign priority of Dutch Patent Application No. NL 1023423 filed May 14, 2003, the entire disclosure of each of which is incorporated herein by reference.

FIELD AND BACKGROUND OF THE INVENTION

The invention relates to a method and an apparatus for distributing communications to mobile recipients.

Such a method is known from European patent application 1 073 293 and from international patent application WO 01/50793. According to these known methods, mobile, addressable telecommunication devices, according to these examples mobile telephones, are registered in a database and, on the basis of data stored in the database, which determine for the respective devices to what extent advertising messages may be sent to these devices, advertising messages to be distributed are sent to the respective devices.

A drawback of these manners of distributing advertising messages is that they are sent as separate communications, which involves relatively high costs, and the user of the device on which the message has been received needs to separately operate and consult the device in reaction to signaling receipt of a message, to then conclude that the received communication merely contains an advertising message. A further drawback is that the advertising messages can only be distributed to devices of users who are registered, which limits the size of the population of users to whom the advertisement can be sent.

A variant of such a method is described in international patent application WO 01/22748, according to which, by means of a mobile telecommunication device, a request is sent to receive messages, such as route information or information regarding places which are touristically or otherwise important, depending on the occurrence of certain conditions, such as the position of the device, which may, for instance, have been determined by means of an incorporated GPS receiver. Here, it is provided that communications are sent in combination with an advertising message to be distributed if space is present for this. Although this obviates the drawbacks that the advertising messages are separately sent and the user needs to separately operate and consult his device when the advertising message is received, the population of users of mobile devices which can be reached with advertisements is further limited, because they can only be reached if they have requested conditional requests for sending information and if the respective condition which occasions the sending of information occurs.

SUMMARY OF THE INVENTION

It is an object of the invention to provide a solution which makes it possible to brings messages to be distributed, such as advertising messages, to the notice of a larger population of users, while the relatively expensive sending and receiving of separate advertising messages, which involves bother for the recipient, is avoided.

According to the present invention, this object is achieved with a method according to claim 1. For carrying out the method, the invention further provides an apparatus according to claim 8.

Because the messages to be distributed are added to communications coming from devices of users, the possibility is created to add messages with the consent of registered users, which messages, with the communications, can also reach non-registered users, without the users to whom the messages are sent needing to separately operate their device for taking notice of the messages. The communications in which the messages can be included may, for instance, be SMS or MMS communications or communications composed according to another standard.

Special elaborations of the invention are set forth in the dependent claims. Further aspects, effects and details of the invention are described and elucidated on the basis of exemplary embodiments with reference to the drawing.

DETAILED DESCRIPTION

Figure 1:
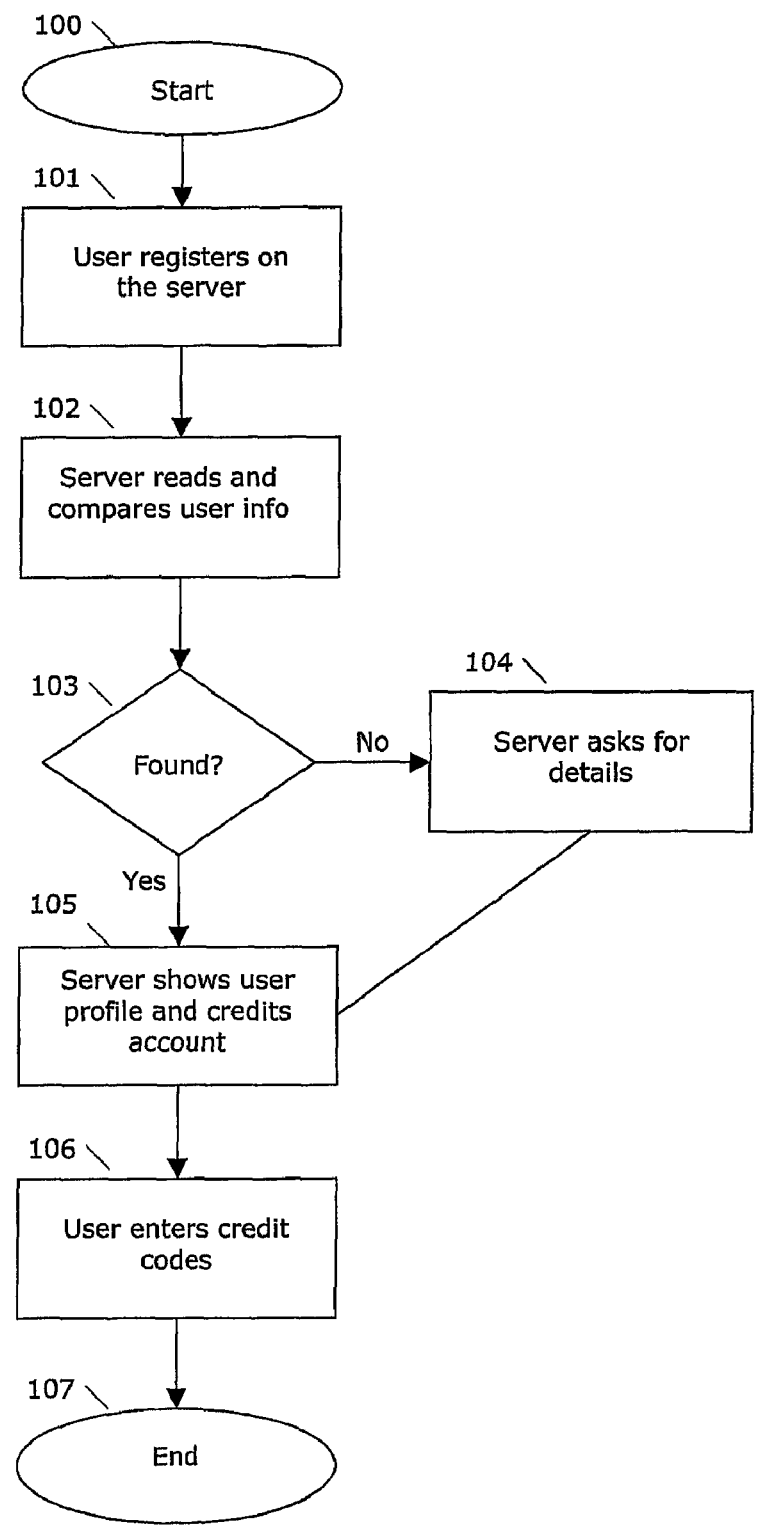
FIG. 1 is a flow chart of a registration procedure and the upgrading of the account with a central system server.

The invention is first of all further elucidated in and by an example, which is based on collecting credits which can be used to send communications from one mobile device to another mobile device for free or at a reduced rate. However, it is also possible that the payment of the sending of the communications takes place in a different manner. Credits may, for instance, be available when buying a product, purchasing a service or taking out a subscription. The credits may, for instance, be issued by means of a scratch card or a code communicated in a different manner and may be registered in relation to the telephone bill of the user, for instance via an Internet Portal where the user has at least filled out his name, address, city/town and mobile telephone number.

After registration, the "saving account" of the user is kept. This makes it, for instance, possible for the user to send free, or at least sponsored, communications via his own mobile phone. A form of P2P (peer-to-peer) advertising is created. When consumer A then sends a communication to consumer B via his mobile telephone, he can do this for free or at a reduced rate. The sponsor of the communication pays at least a part of the costs of the communication and in exchange, a short commercial message is added to the sent communication.

The commercial message coupled to the communication can be adjusted both with regard to text and layout to, for instance, the days of the week, to particular times of the day and/or to other particularities.

Additional payment by the user of amounts per communication to which a message has been added is also possible: the user registers, chooses, for instance, an idealistic cause, and from that moment, the user and/or a third party pays an extra amount per communication for the benefit of the chosen good cause. The communication is provided with an addition related to the chosen good cause. The user may set an upper limit for his contributions. It is also possible that the added message is a service for which the user pays, such as adding a map on which the momentary position of the device of the sender is shown or laying out the message (optionally with addition of standard details regarding the user).

The user may approach the server via various protocols, such as http, smtp, wap and gprs. Just to be perfectly clear: this is by no means a limitative enumeration of the possibilities.

Here, a distinction is made between the concepts "communication server" and "(central) system server." The communication server is a conventional apparatus for the processing of digital communication traffic. On this communication server, each sent communication is temporarily kept for carrying out various checks. Examples of these checks are "billing" (payment between different providers and the users of the separate devices (prepaid or subscriber) registered with the respective communication server). The system server or, optionally, the communication server checks whether the user is registered in the sense that he can make use of the service of addition of sponsored messages or messages to be paid to his communications. By means of the system server, the communication is either sent on unmodified or sent on adjusted, in that a message is added, to the addressed device.

A further possibility to make a distinction between dedicated hardware and software and non-dedicated hardware and software. The device of the user may be designed such that the user who wants to send a communication can make a choice between sending the communication via a conventional ("non-dedicated") communication server and sending it via a communication server designed for adding messages ("dedicated").

If, for instance, an SMS communication is sent with a conventional mobile telephone, this takes place with a preset telephone number of the communication exchange of the provider of the user. By providing an extra option on the mobile telephone, so that, in addition to the standard telephone number of the provider, a second telephone number can be programmed of the "dedicated" communication server, it can be decided to have the adding of the message to the communication take place. The mobile telephone then has, for instance, two keys or menu options: one for conventional communication traffic and one for communication traffic with addition of messages by a third party, whether or not for a fee or at a charge.

In the present context, the non-processing of a communication means that the communication is not sent on to the recipient and that, for instance, the sender receives the communication back or receives an error message stating the reason of non-processing.

The example shown in FIG. 1 of a procedure for registering and upgrading credits/the account with a central system server starts at 100. Then, the user approaches the system server via an existing protocol and registers (step 101). The system server reads and compares the entered user information (step 102) and then checks whether the user is already known (step 103). If this is not the case, a registration procedure 104 can be followed, in which the server asks the user for details such as user name and password, name, address, city/town, sex, age and (mobile) telephone number(s). When the user has been logged in, the server then shows the user the stored user profile and the number of credits the user has at his disposal (step 105). Step 106 is the upgrading of the credits by means of entering obtained unique codes. Step 107 is the closing of this procedure.

Figure 2:
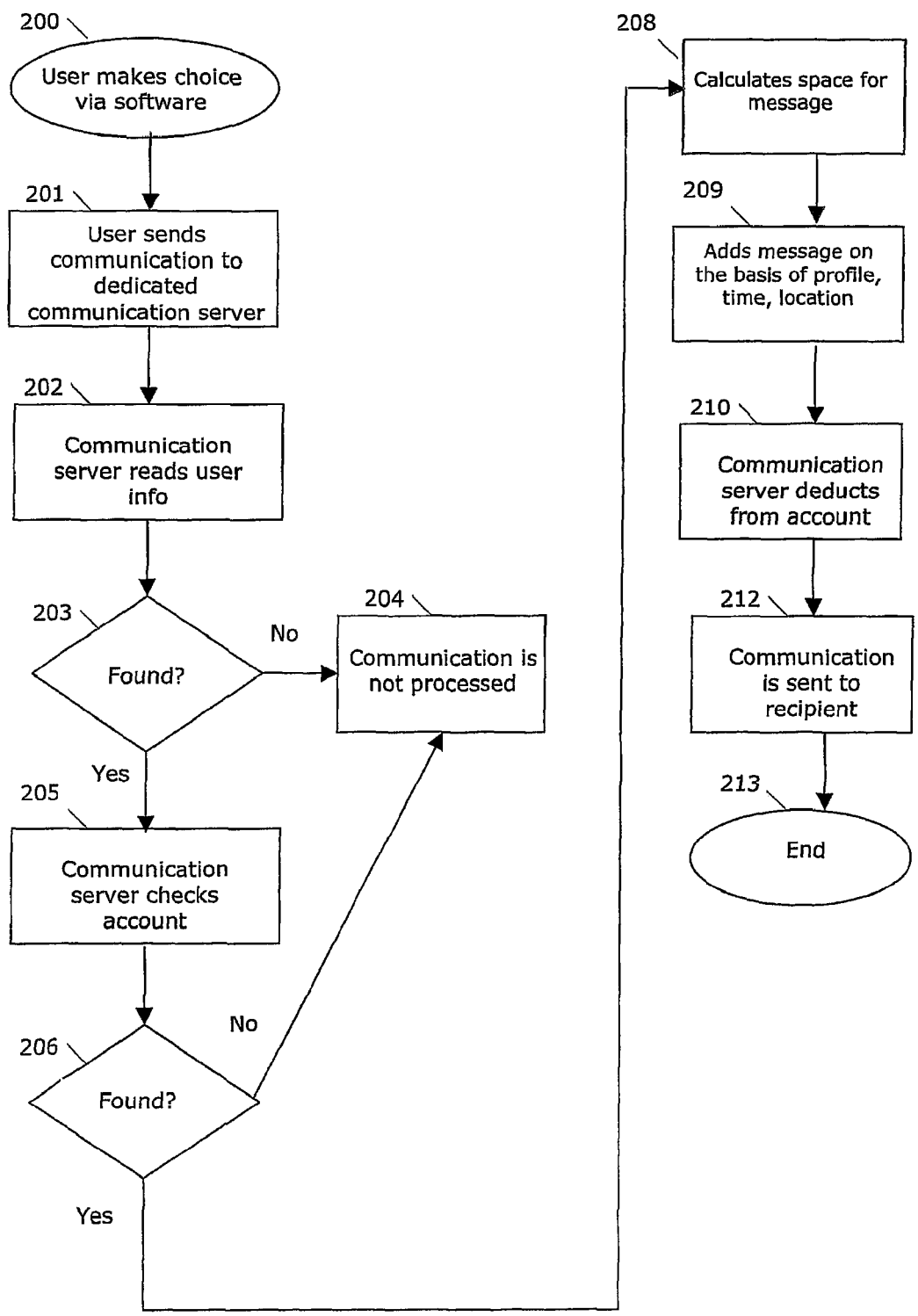
FIG. 2 is a flow chart of the sending of a communication by use of software and/or hardware adapted for application of the invention, the addition of a commercial message and the delivery of the communication to a recipient.

The example shown in FIG. 2 of adding a commercial message to the communication sent by the user starts with the user making, by means of a provision on his device, a choice for sending a communication via a communication server or server structure designed for adding messages ("dedicated") (step 200). In 201, by means of his device, the user sends a communication addressed to a device of a recipient intended by him (peer-to-peer communication). This communication is received by the dedicated communication server (step 202). The dedicated communication server reads user information included in the received communication, checks whether the sender of the communication is registered (step 203), and determines whether the communication is to be accepted. If the sender is not registered as a user of the invention, the communication is not processed and the non-processed procedure is followed (step 204). If the sender is registered, the communication server checks the credits account of the user (step 205). In case of an insufficient account, procedure 204 is again applicable and the message is not processed. If the account is sufficient, the communication server calculates if there is sufficient space for the message to be added. If there is insufficient space, the communication server may (if necessary for the chosen medium) create an extra communication which is coupled to the original communication. As step 206, the communication server then adds a commercial message. This may take place on the basis of various conditions, such as the user profile, the type of credits, the location of the sender and the time of sending. The messages to be added, which, incidentally, may have been automatically dynamically edited depending on conditions, have been laid down in advance by the manager of the server and are stored in a database coupled to the communication server. In other words, there is a limitative number of messages chosen by the manager from which the message to be added can be chosen. Depending on the medium for sending chosen by the user, a message can be chosen which consists of text and/or image and/or sound. The communication server then deducts the used number of credits from the account of the user (step 210) and sends the processed and adjusted communication to the addressed party in a manner which is conventional per se (step 212).

Figure 3:
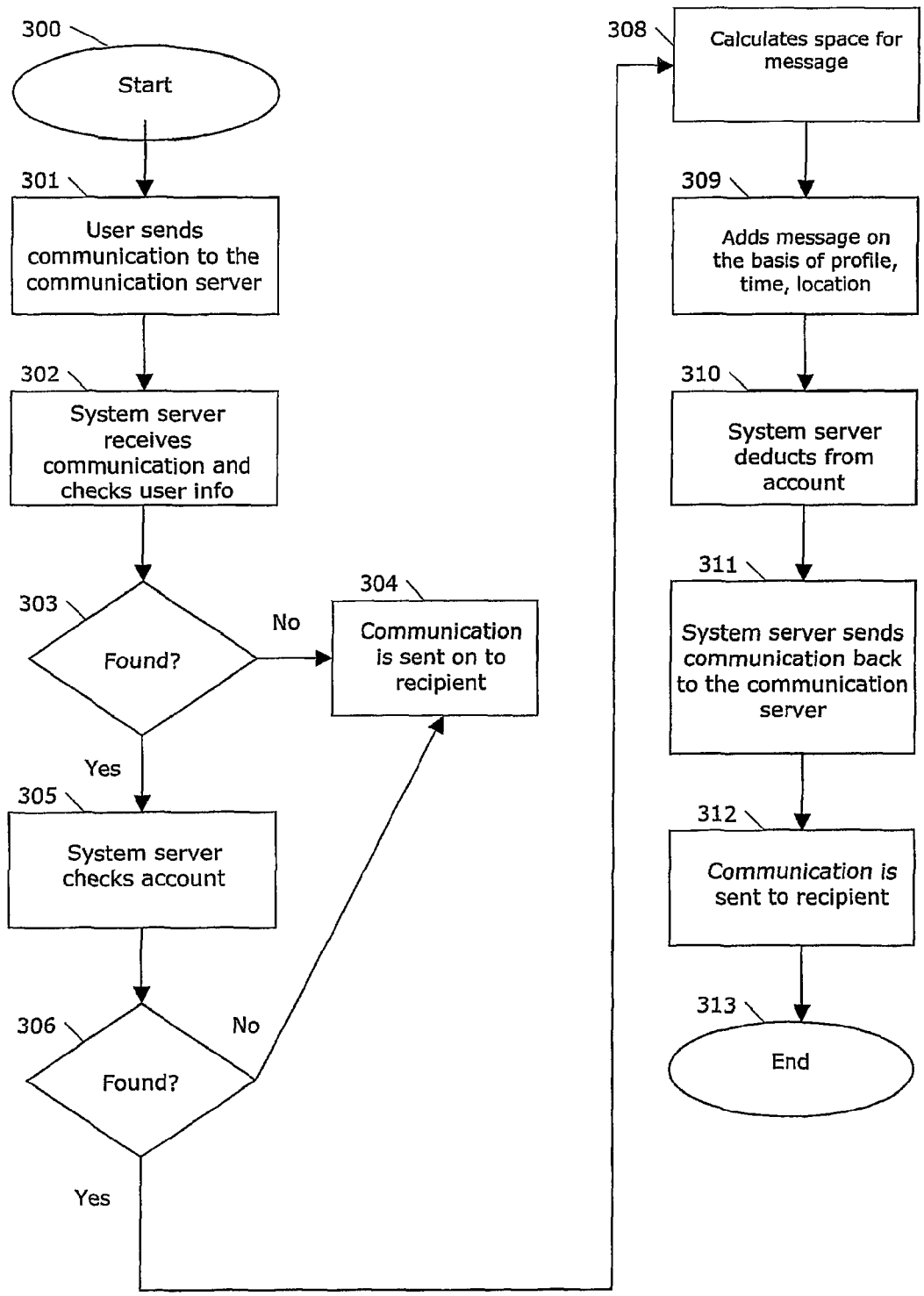
FIG. 3 is a flow chart in accordance with FIG. 2, but it shows the sending of a communication without software or hardware adapted for application of the invention.

The example shown in FIG. 3 of adding a commercial message to the communication sent by the user takes place by directing the message to the addressed party by means of a conventional (non-dedicated) communication server.

Here, the starting (step 300) of the procedure does not comprise the choice for a dedicated communication server, but only the choice for the device function of sending a communication. In 301, the device of the user sends a communication addressed to the recipient intended by him (peer-to-peer communication). The communication also contains a message addition code which indicates that the communication is intended for addition of a message by means of a system server communicating with the communication server. This message addition code may, for instance, be a processing code included at the beginning of the communication, an address (registered as a number which can be chosen at a special rate or for free) or an element in the address. The user himself can choose to send a sponsored SMS communication or one at his own expense by choosing or not choosing the message addition code.

This communication is received by the conventional (non-dedicated) communication server. The communication server recognizes the message addition code and sends the communication to the system server in reaction to this. It is also possible to send all communications of users registered for message addition to the system server and to have the check for presence of a message addition code be carried out by the system server. The system server reads the communication (step 302) and checks whether the sender is registered (step 303). If the sender is not registered as a user, a communication-not-processed procedure 304 is followed and a non-processed communication is sent to the recipient via the communication server. If the sender is registered, the system server checks the credits account of the user (step 305). In case of an insufficient account, the non-processed procedure 304 is again applicable. If the account is sufficient, the system server checks whether there is sufficient space for the commercial message to be added (step 308). If there is insufficient space, the system server may (if necessary for the chosen medium) create an extra communication which is coupled to the original communication for sending it in combination therewith. The system server then adds a message which is selected and optionally automatically edited in a similar manner to the manner described in the above-described example. The system server then deducts the number of used credits from the account of the user (step 310) and sends the processed communication back to the non-dedicated communication server (step 311), with the address being the address of his message as indicated by the sender. The communication server then sends the communication to the recipient in the conventional manner (step 312).

Figure 4:
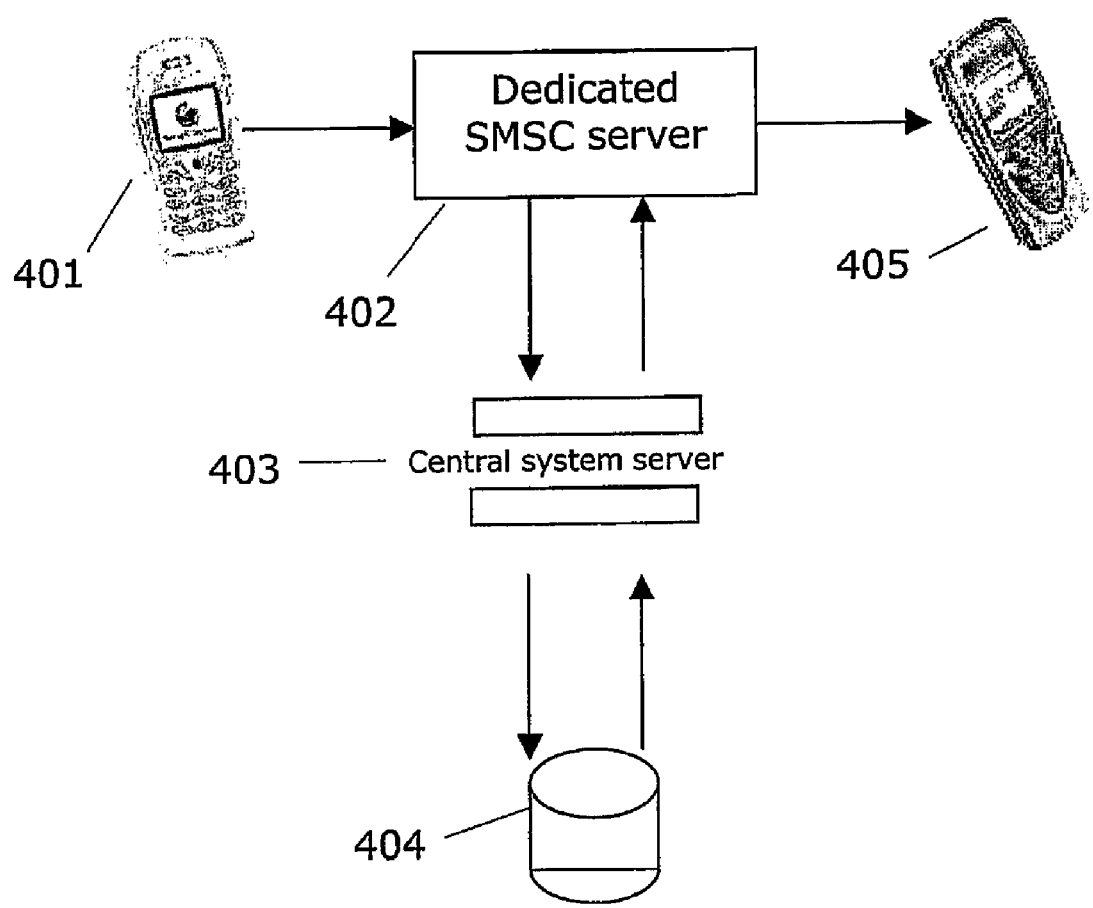
FIGS. 4 and 5 show communication processing structures for application of a method according to FIGS. 3, 4 and 6.

FIG. 4 shows an example of a server structure designed for processing communications basically according to the procedure shown in FIG. 2, where the device 401 of the sender is a mobile telephone designed or at least programmed specially for allowing the addition of messages to communications ("dedicated").

It has been chosen to describe the implementation of the invention in the medium SMS as an example. In this process, the dedicated communication server is referred to as the dedicated SMSC server. Via a preset on his mobile telephone 401 (number of user for instance: 06 11111111), the user sends an SMS communication addressed to the mobile telephone 405 of the recipient chosen by him having, for instance, number 06 22222222. Because the device 401 has chosen the number of a dedicated SMSC server 402 for sending the communication, the SMS communication is directed to this dedicated SMSC server 402. As indicated in FIG. 2, this can carry out the checking and processing of the communications. Unlike what has been described in FIG. 2, it is, however, also possible that the dedicated SMSC server 402 leaves one or more of the steps related to the processing of all received communications to the system server 403 coupled therewith, where the SMS communication is provided with a message in the manner described with reference to FIG. 2, and by means of information obtained from the database 404 coupled to the system server. After this, the processed communication is sent back to the dedicated SMSC server, which then sends the communication on to the recipient 405 in a conventional manner.

Figure 5:
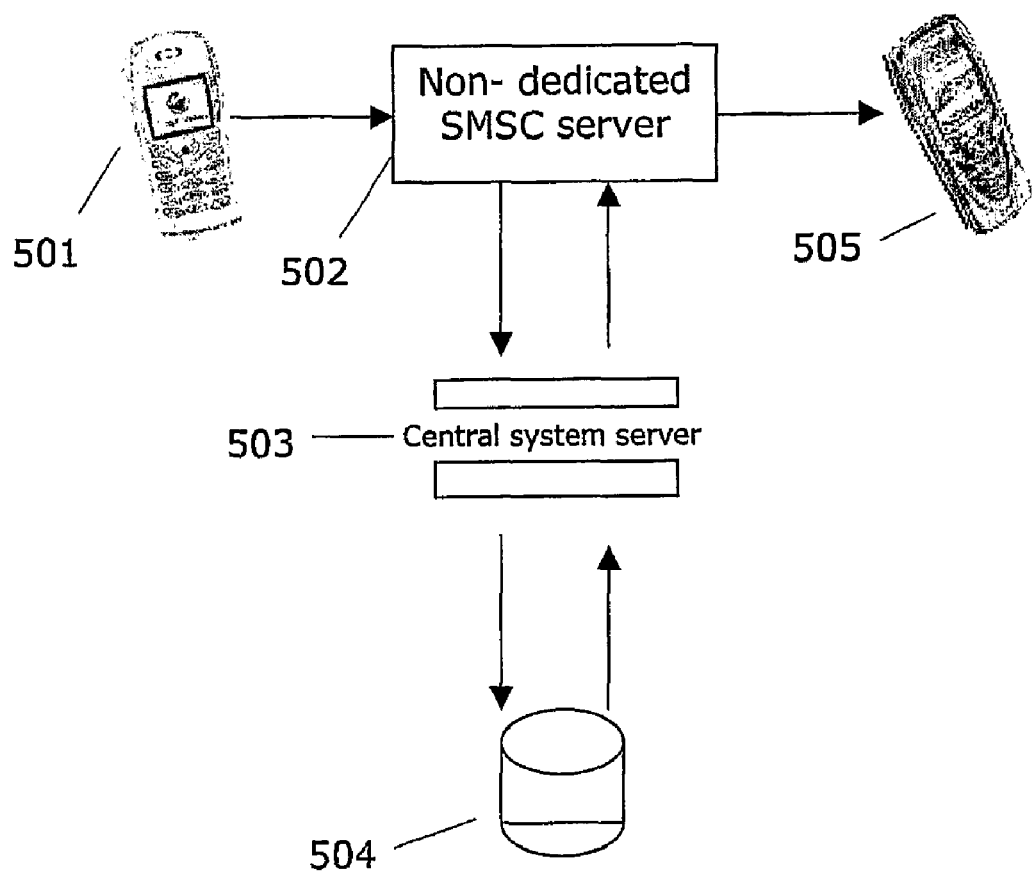

FIG. 5 is an example of a server structure designed for processing communications according to the procedure shown in FIG. 2. Here, the device of the sender is a conventional (non-dedicated) mobile telephone 401 which, each time, sends communications of a particular type, according to this example SMS communications, to a communication server 502 intended for processing both communications to be edited and communications not to be edited ("non-dedicated" communication server).

In this process, the communication server is referred to as the SMSC server 502. From his mobile telephone 501, the user sends an SMS communication addressed to the mobile telephone of the recipient chosen by him. The SMS communication is directed to the SMSC server 502. As described with reference to FIG. 3, the SMS communication is then, exclusively in reaction to a message addition code, directed to the system server 503, where the SMS communication is provided with a message, depending on information obtained from the database 504 coupled to the system server 503. After this, the processed communication is sent back to the SMSC server 502, which then sends the communication to the recipient 505 in a conventional manner.

As a result of the registering, for at least a number of the devices or users, of data related to sent communications and the messages added to them for each device or each user separately, and the recording of data in at least one payment file depending on mutations of data related to sent communications and the messages added to them, the sending of communications can be coupled to an account of the sender with a party which manages the message sending. This makes the addition of messages to communications for a fee or at a charge particularly well manageable. In particular for the relatively expensive sending of communications to and/or from mobile devices, it is advantageous to be able to manage the contributions per user and per communication, for instance depending on expenses of the user with a paying or contributing party. The combined reward for custom and allowing messages makes a, for the user substantial, contribution towards the costs per communication of sending communications possible.

If selecting a message from a number of messages takes place depending on the code included by the user in the received message, the user can influence or determine the choice of the message, for instance taking into account the nature of the communication or the interests of the recipient.

Figure 6:
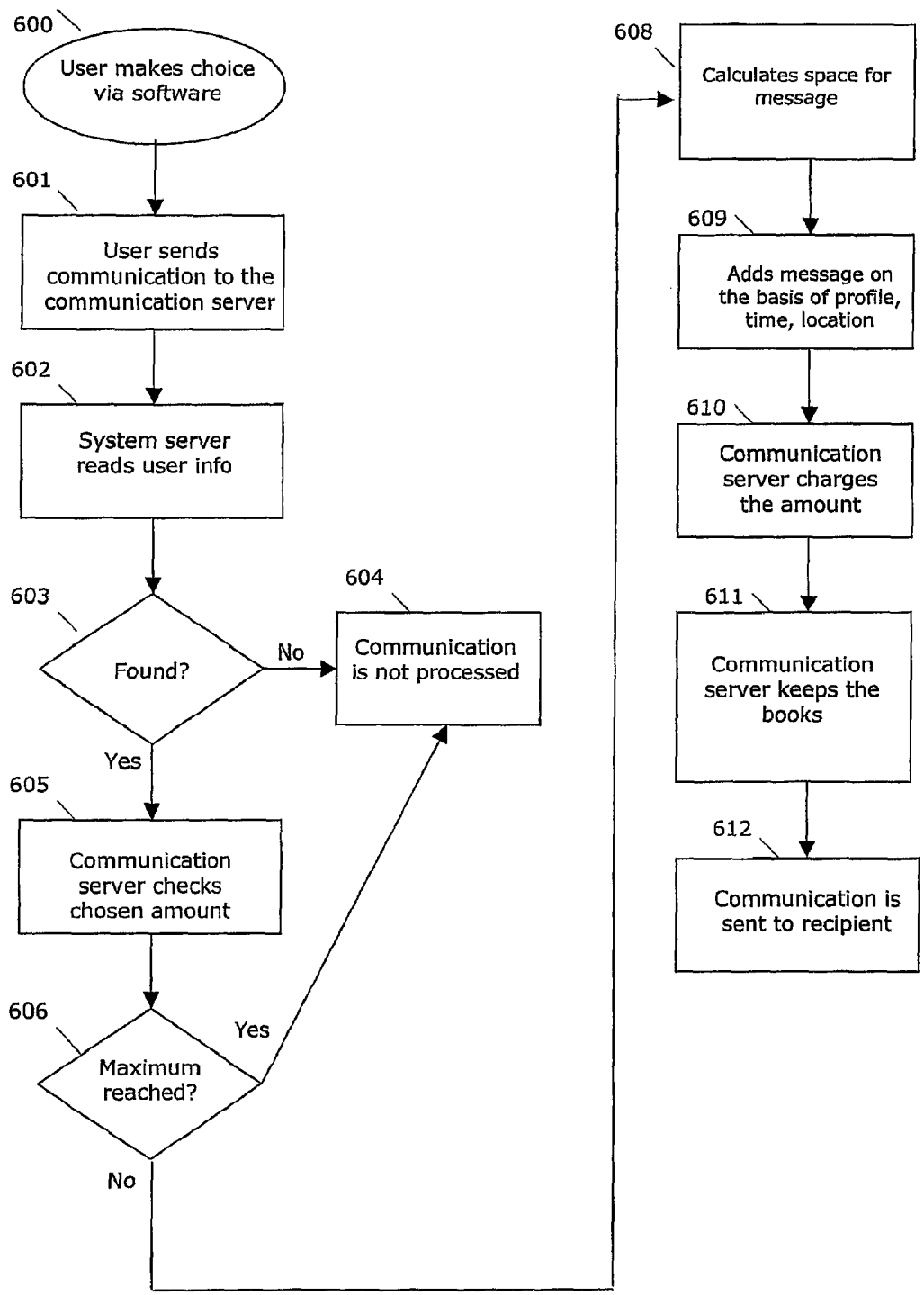
FIG. 6 is a flow chart of the sending of a communication by use of software and/or hardware adapted for application of the invention, the addition of a message, the payment of an amount due for the sending with the added message and the delivery of the communication to a recipient.

FIG. 6 is a further example of a procedure, where a message is added to the communication sent by the user at a charge for the sender.

Steps 600-604 and 608-610 and 612 are similar to steps 200-204 and 208-210 and 212 in FIG. 2. What is different is that, in step 605, the maximum amount is read by the server and, in step 606, it is checked whether the maximum amount chosen in advance by the user has been reached or will be exceeded by processing the communication. If the amount would be exceeded, the non-processed procedure 604 would be put into operation.

The invention claimed is:

1. A method for enabling a user of a first distributed device to communicate with a second distributed device using a variable cost structure, comprising:

configuring a user interface of the first distributed device to have a plurality of user-selectable options for sending a communication to the second distributed device, a first one of the user-selectable options relating to sending of a communication without an added message and a second one of the user-selectable options relating to sending of a communication with an added message;

enabling a user of the first distributed device to select, using the user interface of the first distributed device, whether to send the communication to the second distributed device using a first communication server of a communications network at a first cost to the user of the first distributed device or a second communication server of the communications network at a second cost to the user of the first distributed device different than the first cost, the step of enabling the user to select whether to send the communication to the second distributed device using the first or second communications server comprising associating the first user-selectable option with an indication of use of the first communications server and associating the second user-selectable options with an indication of use of the second communications server;

directing the communication to the first communication server to be forwarded therefrom to the second distributed device when the user selects the first user-selectable option and thus to send the communication to the second distributed device using the first communication server; and directing the communication to the second communication server to be forwarded therefrom to the second distributed device when the user selects the second user-selectable option and thus to send the communication to the second distributed device using the second communication server, whereby when the user selects to send the communication to the second distributed device using the first communication server, a message is not added to the communication and when the user selects to send the communication to the second distributed device using the second communication server, a message is added to the communication such that the communication and added message are delivered to the second distributed device and the second cost to send the communication is less than the first cost to send the communication.

2. The method of claim 1, wherein the step of configuring the user interface comprises arranging the user interface of the first distributed device to present the user with two keys or menu options to enable the user to select whether to send the communication to the second distributed device using the first communication server or the second communication server, the two keys or menu options constituting the first and second user-selectable options.

3. The method of claim 1, wherein a first telephone number is assigned to access the first communication server and a second telephone number is assigned to access the second communication server, further comprising:

causing the first distributed device to dial the first telephone number when the user selects to send the communication to the second distributed device using the first communication server; and causing the first distributed device to dial the second telephone number when the user selects to send the communication to the second distributed device using the second communication server.

4. The method of claim 3, further comprising programming the first and second telephone numbers into a memory component of the first distributed device.

5. The method of claim 1, further comprising:

generating the communication at the first distributed device to comprise a header including sender address information, receiver address information, and message content which includes user identification; and including in the user identification an indication of whether the user of the first distributed device is registered to use the second communication server to send communications to the second distributed device.

6. The method of claim 1, wherein one of a plurality of different messages is added to the communication based on at least one of data about the user of the first distributed device, data about a user of the second distributed device, a time at which the communication is being sent, a location of the first distributed device and a location of the second distributed device.

7. The method of claim 1, wherein one of a plurality of different messages is added to the communication based on a code inserted by the first distributed device.

8. A distributed device for use with a system for processing digital communication traffic that includes a first communication server and a second communication server, the distributed device comprising:

a user interface that enables a user of the distributed device to select whether to send a communication to another distributed device using the first communication server or the second communication server, the user interface having a plurality of user-selectable options for sending the communication to the other distributed device, a first one of the user-selectable options relating to sending of a communication without an added message and a second one of the user-selectable options relating to sending of a communication with an added message, the first user-selectable option being associated with an indication of use of the first communications server and the second user-selectable option being associated with an indication of use of the second communications server; and a processor that:

when the user selects, using the first user-selectable option of the user interface, to send the communication to the other distributed device using the first communication server, directs the communication to the first communication server to be forwarded therefrom to the other distributed device; and when the user selects, using the second user-selectable option of the user interface, to send the communication to the other distributed device using the second communication server, directs the communication to the second communication server to have a message added thereto with the communication and the added message being directed to the second distributed device, whereby when the user selects to send the communication to the other distributed device using the first communication server, a message is not added to the communication.

9. The distributed device of claim 8, wherein the user interface is arranged to present the user with two keys or menu options to enable the user to select whether to send the communication to the other distributed device using the first communication server or the second communication server, the two keys or menu options constituting the first and second user-selectable options.

10. The distributed device of claim 8, wherein a first telephone number is assigned to access the first communication server and a second telephone number is assigned to access the second communication server, the processor being arranged such that:

when the user selects to send the communication using the first communication server, the first telephone number is dialed; and when the user selects to send the communication using the second communication server, the second telephone number is dialed.

11. The distributed device of claim 10, further comprising a memory component in which the first and second telephone numbers are stored.

12. The distributed device of claim 8, wherein the processor is arranged to generate the communication to comprise a header including sender address information, receiver address information, and message content which includes user identification that enables the second communication server to determine whether the user is registered to use the second communication server to send communications.

13. The distributed device of claim 8, wherein the processor is arranged to generate the communication to comprise a header including sender address information, receiver address information, and message content which includes a user inserted code that enables the second communication server to determine which of a plurality of messages to add to the communication.

14. A communication server of a communication processing structure for processing digital communication traffic in a network, the communication server including a processor and a computer program embodied on computer-readable medium that are arranged to:
receive a communication from a first distributed device that is configured to enable a user thereof to insert a code relating to a message to be added to the communication that is directed to a second distributed device, the communication received by the communication server including the code when inserted by the user;
determine whether conditions are present to allow a message to be added to the communication, the step of determining whether the conditions are present including determining whether the user inserted code is present in the communication from the first distributed device;
when the conditions are determined to be present, selecting one of a plurality of different messages to add to the communication based on the user inserted code and adding the selected message to the communication; and then
directing the communication with the added message to the second distributed device.

15. The communication server of claim 14, wherein one of the conditions is whether the user of the first distributed device is a registered user of the communication server.

16. The communication server of claim 15, wherein the communication received by the communication server includes user identification, the processor and computer-readable medium being further arranged to determine, based on the user information in the communication, whether the user of the first distributed device is registered to use the communication server to send communications to the second distributed device and if not, cease further processing of the communication.

17. The communication server of claim 14, wherein one of the conditions is whether the user of the first distributed device has sufficient credit in an account to deliver the communication to the second distributed device.

18. The communication server of claim 17, wherein the processor and computer-readable medium are further arranged to determine whether the account has sufficient credit to enable delivery of the communication to the second distributed device and if not, cease further processing of the communication.

19. The communication server of claim 17, wherein a plurality of messages that can be added to the communication are stored in a storage component, the processor and computer-readable medium are further arranged to select the message to add to the communication from the storage component based on at least one of a type of credit in the account, data about the user of the first distributed device, data about a user of the second distributed device, a time at which the communication is being sent, a location of the first distributed device and a location of the second distributed device.

20. The communication server of claim 14, wherein a plurality of messages that can be added to the communication are stored in a storage component, the processor and computer-readable medium are further arranged to select the message to add to the communication based on at least one of data about the user of the first distributed device, data about a user of the second distributed device, a time at which the communication is being sent, a location of the first distributed device and a location of the second distributed device.

21. The communication server of claim 14, wherein the processor and computer-readable medium are further arranged to determine whether the communication has available space for the message to be added thereto and if not, couple an additional communication including the message to the communication and direct both the communication and additional communication to the second distributed device.

22. The communication server of claim 14, wherein the processor and computer-readable medium are further arranged to maintain an account for the user of the first distributed device and adjust a balance of the account whenever the user selects to send the communication to the second distributed device using the communication server.

23. A method for processing digital communication traffic in a network, comprising:
receiving, at a communication server, a communication from a first distributed device that is configured to enable a user thereof to insert a code relating to a message to be added to a communication being directed to a second distributed device, the communication received by the communication server including the code when inserted by the user;
determining, at the communication server, whether conditions are present to allow a message to be added to the communication, the step of determining whether the conditions are present including determining whether the user inserted code is present in the communication from the first distributed device;
when the conditions are determined to be present, selecting one of a plurality of different messages to add to the communication based on the user inserted code and adding the selected message to the communication; and then
directing, via a telecommunications network, the communication with the added message to the second distributed device.

24. The method of claim 23, wherein the step of determining, whether conditions are present to allow a message to be added to the communication comprises determining whether the user of the first distributed device is a registered user of the communication server.

25. The method of claim 24, further comprising:
determining, based on user information in the received communication, whether the user of the first distributed device is registered to use the communication server to send communications to the second distributed device; and
ceasing further processing of the communication if the user of the first distributed device is not registered to send communications to the second distributed device.

26. The method of claim 23, wherein the step of determining, whether conditions are present to allow a message to be added to the communication comprises determining whether the user of the first distributed device has sufficient credit in an account to deliver the communication to the second distributed device.

27. The method of claim 26, further comprising ceasing further processing of the communication if the user of the first distributed device does not have sufficient credit in the account to enable delivery of the communication to the second distributed device.

28. The method of claim 26, further comprising:
storing a plurality of messages that can be added to the communication in a storage component; and
selecting, at the communication server, one of the plurality of stored messages to add to the communication based on at least one of a type of credit in the account, data about the user of the first distributed device, data about a user of the second distributed device, a time at which the communication is being sent, a location of the first distributed device and a location of the second distributed device.

29. The method of claim 23, further comprising:
storing a plurality of messages that can be added to the communication in a storage component; and
selecting, at the communication server, one of the plurality of stored messages to add to the communication based on at least one of data about the user of the first distributed device, data about a user of the second distributed device, a time at which the communication is being sent, a location of the first distributed device and a location of the second distributed device.

30. The method of claim 23, further comprising:
determining, at the communication server, whether the communication has available space for the message to be added thereto; and if not,
coupling an additional communication including the message to the communication and directing both the communication and additional communication to the second distributed device.

31. The method of claim 23, further comprising:
maintaining, in a storage component, an account for the user of the first distributed device; and
adjusting a balance of the account whenever the communication from the first distributed device to the second distributed device uses the communication server.

32. A communication processing structure for processing digital communication traffic in a network, comprising:
a first communication server;
a second communication server; and
a plurality of distributed devices of users designed for communication with the first and second communication servers,
a first one of the distributed devices comprising:
a user interface that enables a user of the distributed device to select whether to send a communication to a second one of the distributed devices using the first communication server or the second communication server, the user interface having a plurality of user-selectable options for sending the communication to the second distributed device, a first one of the user-selectable options relating to sending of a communication without an added message and a second one of the user-selectable options relating to sending of a communication with an added message, the first user-selectable option being associated with an indication of use of the first communications server and the second user-selectable option being associated with an indication of use of the second communications server, and a processor that:
when the user selects, using the first user-selectable option of the user interface, to send the communication to the second distributed device using the first communication server, directs the communication to the second distributed device through the first communication server; and
when the user selects, using the second user-selectable option of the user interface, to send the communication to the second distributed device using the second communication server, directs the communication to the second communication server,
the first communication server being arranged to forward the communication it receives from the first distributed device to the second distributed device without adding a message to the communication;
the second communication server being arranged to process the communication it receives from the first distributed device in order to add a message to the communication with the communication and added message then being directed to the second distributed device.

33. The communication processing structure of claim 32, wherein the user interface of the first distributed device is arranged to present the user with two keys or menu options to enable the user to select whether to send the communication to the second distributed device using the first communication server or the second communication server, the two keys or menu options constituting the first and second user-selectable options.

34. The communication processing structure of claim 32, wherein the second communication server is arranged to maintain an account for the user of the first distributed device and adjust a balance of the account whenever the user selects to send the communication to the second distributed device using the second communication server.

35. The communication processing structure of claim 32, wherein a first telephone number is assigned to access the first communication server and a second telephone number is assigned to access the second communication server, the first distributed device being arranged such that when the user selects to send the communication to the second distributed device using the first communication server, the first distributed device dials the first telephone number and when the user selects to send the communication to the second distributed device using the second communication server, the first distributed device dials the second telephone number.

36. The communication processing structure of claim 35, wherein the first distributed device includes a memory component in which the first and second telephone numbers are stored.

37. The communication processing structure of claim 32, wherein the processor is arranged to generate the communication to comprise a header including sender address information, receiver address information, and message content which includes user identification, the second communication server being arranged to determine, based on the user information in the communication, whether the user of the first distributed device is registered to use the second communication server to send communications to the second distributed device and if not, cease further processing of the communication.

38. The communication processing structure of claim 32, wherein the second communication server is arranged to ascertain whether an account associated with the user of the first distributed device has sufficient credit to enable delivery of the communication to the second distributed device and if not, cease further processing of the communication.

39. The communication processing structure of claim 38, further comprising:
a storage component in which a plurality of messages that can be added to the communication are stored,
the second communication server being arranged to select the message to be added to the communication based on at least one of a type of credit in the account, data about the user of the first distributed device, data about a user of the second distributed device, a time at which the communication is being sent, a location of the first distributed device and a location of the second distributed device.

40. The communication processing structure of claim 39, wherein the storage component is separate from the second communication server, the second communication server being arranged to access the storage component in order to receive a message stored in the storage component to be added to the communication.

41. The communication processing structure of claim 32, wherein the second communication server is arranged to determine whether the communication has available space for the message to be added thereto and if not, couple an additional communication including the message to the communication and direct both the communication and additional communication to the second distributed device.

42. The communication processing structure of claim 32, further comprising:
a storage component in which a plurality of messages that can be added to the communication are stored,
the second communication server being arranged to select the message to the communication to add based on at least one of data about the user of the first distributed device, data about a user of the second distributed device, a time at which the communication is being sent, a location of the first distributed device and a location of the second distributed device.

43. The communication processing structure of claim 42, wherein the storage component is separate from the second communication server, the second communication server being arranged to access the storage component in order to receive a message stored in the storage component to add to the communication.

44. The communication processing structure of claim 32, further comprising:
a storage component in which a plurality of messages that can be added to the communication are stored,
the second communication server being arranged to select the message to add to the communication based on a code inserted by the first distributed device.

45. The communication processing structure of claim 44, wherein the storage component is separate from the second communication server, the second communication server being arranged to access the storage component in order to receive a message stored in the storage component to add to the communication.

46. A method for processing digital communication traffic in a network comprising a central communication processing structure including a first communication server, a second communication server and a plurality of distributed devices of users designed for communication with the central communication processing structure, the method comprising:
configuring a user interface of a first one of the distributed devices to have a plurality of user-selectable options for sending a communication to a second one of the distributed devices, a first one of the user-selectable options relating to sending of a communication without an added message and a second one of the user-selectable options relating to sending of a communication with an added message;
enabling a user of the first one of the distributed devices to select, using the user interface of the first distributed device, whether to send the communication to the second one of the distributed devices using the first communication server or the second communication server, the step of enabling the user to select whether to send the communication to the second distributed device using the first or second communications server comprising associating the first user-selectable option with an indication of use of the first communications server and associating the second user-selectable option with an indication of use of the second communications server;
when the user selects the first user-selectable option and thus to send the communication to the second distributed device using the first communication server, directing the communication from the first distributed device to the second distributed devices through the first communication server; and
when the user selects the second user-selectable option and thus to send the communication to the second distributed device using the second communication server, directing the communication from the first distributed device to the second distributed device through the second communication server while adding a message to the communication such that the communication and added message are delivered to the second distributed device,
whereby when the user selects to send the communication to the second distributed device using the first communication server, a message is not added to the communication.

47. The method of claim 46, wherein the step of directing the communication from the first distributed device to the second distributed device through the second communication server while adding a message to the communication comprises:
directing the communication from the first distributed device to the second communication server,
adding a message at the second communication server to the communication from the first distributed device being sent to the second distributed device, and then
directing the communication with the added message from the second communication server to the second distributed device.

48. The method of claim 46, wherein the step of configuring the user interface comprises arranging the user interface of the first distributed device to present the user with two keys or menu options to enable the user to select whether to send the communication to the second distributed device using the first communication server or the second communication server, the two keys or menu options constituting the first and second user-selectable options.

49. The method of claim 46, further comprising:
maintaining an account for the user of the first distributed device; and
adjusting a balance of the account whenever the user selects to send the communication to the second distributed device using the second communication server.

50. The method of claim 46, further comprising:
assigning a first telephone number to access the first communication server;
assigning a second telephone number to access the second communication server;
when the user selects to send the communication to the second distributed device using the first communication server, causing the first distributed device to dial the first telephone number such that the communication from the first distributed device to the second distributed devices uses the first communication server; and when the user selects to send the communication to the second distributed device using the second communication server, causing the first distributed device to dial the second telephone number such that the communication from the first distributed device to the second distributed devices uses the second communication server.

51. The method of claim 50, further comprising programming the first and second telephone numbers into a memory component of the first distributed device.

52. The method of claim 46, further comprising:
generating the communication at the first distributed device to comprise a header including sender address information, receiver address information, and message content which includes user identification; and
determining at the second communication server, based on the user identification, whether the user of the first distributed device is registered to use the second communication server to send communications to the second distributed device and if not, ceasing further processing of the communication.

53. The method of claim 52, wherein when the user of the first distributed device is determined to be registered to use the second communication server to send communications to the second distributed device, determining whether an account associated with the user of the first distributed device has sufficient credit to enable delivery of the communication to the second distributed device and if not, ceasing further processing of the communication.

54. The method of claim 53, wherein when the user of the first distributed device is determined to be registered to use the second communication server to send communications to the second distributed device and determine to have sufficient credit in the account to enable delivery of the communication to the second distributed device, determining whether the communication has available space for the message to be added thereto and if not, the step of adding a message to the communication comprising coupling an additional communication including the message to the communication and directing both the communication and additional communication to the second distributed device.

55. The method of claim 53, wherein when the user of the first distributed device is determined to be registered to use the second communication server to send communications to the second distributed device and determine to have sufficient credit in the account to enable delivery of the communication to the second distributed device, determining whether the communication has available space for the message to be added thereto and only if so, adding the message to the communication.

56. The method of claim 53, further comprising:
storing a plurality of messages that can be added to the communication in a storage component; and
selecting, using a processor, the message to add to the communication based on at least one of a type of credit in the account, data about the user of the first distributed device, data about a user of the second distributed device, a time at which the communication is being sent, a location of the first distributed device and a location of the second distributed device.

57. The method of claim 56, wherein the storage component is separate from the second communication server, further comprising directing the second communication server to access the storage component in order to receive a message stored in the storage component to add to the communication.

58. The method of claim 46, further comprising:
storing a plurality of messages that can be added to the communication in a storage component; and
selecting, using a processor, the message to add to the communication based on at least one of data about the user of the first distributed device, data about a user of the second distributed device, a time at which the communication is being sent, a location of the first distributed device and a location of the second distributed device.

59. The method of claim 58, wherein the storage component is separate from the second communication server, further comprising directing the second communication server to access the storage component in order to receive a message stored in the storage component to add to the communication.

60. The method of claim 46, further comprising:
storing a plurality of messages that can be added to the communication in a storage component; and
selecting, using a processor, the message to add to the communication based on a code inserted by the first distributed device.

61. The method of claim 60, wherein the storage component is separate from the second communication server, further comprising directing the second communication server to access the storage component in order to receive a message stored in the storage component to add to the communication.

* * * * *